(12) United States Patent
Neher

(10) Patent No.: US 8,102,077 B2
(45) Date of Patent: Jan. 24, 2012

(54) POWER GENERATION AND DISTRIBUTION SYSTEM CONFIGURED TO PROVIDE POWER TO A MOTOR

(75) Inventor: Charles E. Neher, Meridian, ID (US)

(73) Assignee: Wabtec Holding Corp., Wilmerding, PA (US)

( * ) Notice: Subject to any disclaimer, the term of this patent is extended or adjusted under 35 U.S.C. 154(b) by 104 days.

(21) Appl. No.: 12/502,584

(22) Filed: Jul. 14, 2009

(65) Prior Publication Data

US 2011/0012422 A1    Jan. 20, 2011

(51) Int. Cl.
B60L 1/00 (2006.01)
B60L 3/00 (2006.01)
H02G 3/00 (2006.01)

(52) U.S. Cl. .................. 307/9.1; 307/10.1
(58) Field of Classification Search .............. None
See application file for complete search history.

(56) References Cited

U.S. PATENT DOCUMENTS

| | | | |
|---|---|---|---|
| 4,498,016 A | 2/1985 | Earleson et al. | |
| 4,668,872 A | 5/1987 | Lerouge et al. | |
| 4,924,395 A | 5/1990 | Evans et al. | |
| 5,041,772 A | 8/1991 | Earleson et al. | |
| 5,392,741 A | 2/1995 | Uzkan | |
| 5,629,567 A | 5/1997 | Kumar | |
| 5,642,020 A | 6/1997 | Miyazaki | |
| 5,672,920 A * | 9/1997 | Donegan et al. | 307/147 |
| 5,828,554 A * | 10/1998 | Donegan et al. | 361/707 |
| 5,939,800 A * | 8/1999 | Artinian et al. | 307/64 |
| 5,992,950 A | 11/1999 | Kumar et al. | |
| 5,998,880 A | 12/1999 | Kumar | |
| 6,262,896 B1 * | 7/2001 | Stancu et al. | 363/17 |
| 6,487,998 B1 | 12/2002 | Masberg et al. | |
| 6,516,253 B2 | 2/2003 | Boggs et al. | |
| 6,617,820 B2 * | 9/2003 | Carlson et al. | 318/727 |
| 6,725,134 B2 | 4/2004 | Dillen et al. | |
| 6,757,597 B2 | 6/2004 | Yakes et al. | |
| 6,919,648 B2 | 7/2005 | Bolz et al. | |
| 6,984,946 B2 | 1/2006 | Donnelly et al. | |
| 6,989,650 B2 | 1/2006 | Williams | |
| 6,992,403 B1 * | 1/2006 | Raad | 307/47 |
| 7,026,783 B2 | 4/2006 | Eckardt | |
| 7,061,131 B2 | 6/2006 | King et al. | |
| 7,078,877 B2 | 7/2006 | Salasoo et al. | |
| 7,084,602 B2 | 8/2006 | Donnelly et al. | |
| 7,124,691 B2 | 10/2006 | Donnelly et al. | |
| 7,138,733 B2 | 11/2006 | Sanders et al. | |
| 7,164,977 B2 | 1/2007 | Yakes et al. | |
| 7,248,490 B2 | 7/2007 | Olsen et al. | |

(Continued)

*Primary Examiner* — Rexford Barnie
*Assistant Examiner* — Justen Fauth
(74) *Attorney, Agent, or Firm* — The Webb Law Firm

(57) ABSTRACT

A power generation and distribution system for providing power to at least one motor configured to drive a wheel of a vehicle includes: at least one power module having at least one generator configured to generate alternating current having a frequency and voltage; a common alternating current bus in electrical communication with the at least one power module through a contactor and configured to receive the alternating current therefrom; at least one power conversion module in electrical communication with the common alternating current bus and configured to convert the alternating current to a specified direct current for delivery to the at least one motor; and a controller configured to communicate with and operatively control at least one of the following: at least one component of the at least one power module; at least one component of the common alternating current bus; at least one component of the at least one power conversion module; or any combination thereof.

18 Claims, 11 Drawing Sheets

U.S. PATENT DOCUMENTS

| | | |
|---|---|---|
| 7,911,079 B2 * | 3/2011 | Hoff et al. .................... 307/10.1 |
| 2002/0161490 A1 | 10/2002 | Nagasu et al. |
| 2002/0177929 A1 | 11/2002 | Kumar |
| 2002/0183901 A1 | 12/2002 | Wolf et al. |
| 2003/0015387 A1 | 1/2003 | Wang |
| 2003/0187553 A1 | 10/2003 | Dillen et al. |
| 2003/0233959 A1 | 12/2003 | Kumar |
| 2006/0025902 A1 | 2/2006 | Brown et al. |
| 2006/0061213 A1 * | 3/2006 | Michalko ....................... 307/9.1 |
| 2006/0222910 A1 * | 10/2006 | Aoyagi et al. .................. 429/12 |
| 2006/0284489 A1 * | 12/2006 | Gross et al. ..................... 307/64 |
| 2007/0103002 A1 * | 5/2007 | Chiao et al. .................. 307/10.1 |
| 2007/0273209 A1 * | 11/2007 | Endou ............................. 307/45 |
| 2008/0276892 A1 * | 11/2008 | Doljack .................. 123/179.28 |

* cited by examiner

POWER GENERATION AND DISTRIBUTION SYSTEM CONFIGURED TO PROVIDE POWER TO A MOTOR

BACKGROUND OF THE INVENTION

1. Field of the Invention

The present invention, in general, is directed to a power generation and distribution system and, more specifically, to a power generation and distribution system for providing power to one or more motors configured to drive a wheel of a vehicle, such as a locomotive.

2. Description of Related Art

Traction motors are typically used to provide tractive power to move a locomotive. The traction motors are commonly powered using an AC generator. Current multiple traction motor systems use an inverter/chopper to convert the AC output of the electrical generators to DC and then back to AC. However, this process suffers from various deficiencies. First, there is a large amount of electrical energy lost as heat by converting the AC output of the generators to DC and then back to AC using the inverter/chopper. In addition, such prior art systems suffer from slow response times waiting for the control loops to: 1) light off another engine during high peak current demands; and 2) change the voltages/current in response to a changing load.

The use of the inverter/chopper for power conversions also suffers from various deficiencies. First, the inverter/chopper is large, heavy, and expensive. In addition, the inverter/chopper has extremely high EMI emissions which lead to higher engine emissions. Finally, the inverter/chopper cannot feed motor braking energy to other electrical loads and lacks stall and commutator protection.

Furthermore, the auxiliary equipment of the locomotive, such as lighting systems, heating systems, and air conditioning systems, required for use with prior art multiple traction motor system is expensive and must be special ordered. The reason is that such auxiliary equipment requires a variable voltage/frequency that must be supplied by a dedicated and/or companion alternator. Another reason for the increased cost is that the auxiliary equipment commonly used with prior art multiple traction motor systems is much larger than a fixed frequency and/or voltage component.

In addition, the use of software to control a locomotive is known in the art. For example, U.S. Pat. No. 7,124,691 to Donnelly et al. discloses a comprehensive logic and software system to monitor, control, and optimize the locomotive power including control over individual drive axles, especially during acceleration and braking. This system includes: a method of load control for the prime energy source; a method of releasing locked wheels; and a method of accurately controlling the speed of the locomotive in the low speed range. The disclosure is based on a locomotive that utilizes a DC power source. However, the system described in this reference suffers from many of the deficiencies of other prior art multiple traction motor systems discussed hereinabove.

Accordingly, a need exists for a stable source of electrical energy by utilizing utility proven components to synchronize, provide load sharing, and protection of the generation on the AC side. A further need exists for a system to rectify this stable, reliable, constant frequency AC voltage to provide a software defined load characteristic, thereby optimizing traction motor performance.

SUMMARY OF THE INVENTION

An object of the present invention is to provide a power generation and distribution system for a locomotive that utilizes a common AC bus with a constant frequency and voltage output. The use of such a common AC bus has several advantages. First, it allows for the use of off-the-shelf equipment which is readily available and has proven track records in the market place. Therefore, heavy auxiliary equipment, such as blowers, compressors, and HVAC units, purchased as off-the-shelf equipment, enable commodity buys and are available at a lower cost. In addition, the utilization of a common AC bus with a constant frequency and voltage output provides an AC bus voltage that can be easily transformed to accommodate the input voltage requirements of auxiliary equipment if the common bus voltage is unacceptable.

Another object of the present invention is to utilize highly reliable, industry proven, programmable system controls that form a robust control system with distributed processing. The power generation and distribution system for a locomotive of the present invention includes: 1) isochronous governors that allow kW load sharing where each power module takes an equal share of the load; 2) digital voltage regulators that allow voltage sharing as each power module generates an equal voltage minimizing circulating currents; and 3) digital protective relays that protect each generator and silicon-controlled rectifier (SCR) drive from abnormal system conditions.

A further object of the present invention is to utilize SCR drives for power conversion rather than the prior art inverter/chopper. Such SCR drives weigh much less, take up less space, are less expensive, and have lower EMI emissions when compared to a prior art inverter/chopper.

Therefore, the present invention is directed to a power generation and distribution system for providing power to at least one motor configured to drive a wheel of a vehicle. The system includes at least one power module having at least one generator configured to generate alternating current having a frequency and voltage; a common alternating current bus in electrical communication with the at least one power module through a contactor and configured to receive the alternating current therefrom; at least one power conversion module in electrical communication with the common alternating current bus and configured to convert the alternating current to a specified direct current for delivery to the at least one motor; and a controller configured to communicate with and operatively control at least one of the following: at least one component of the at least one power module, at least one component of the common alternating current bus, at least one component of the at least one power conversion module, or any combination thereof.

The controller may be in communication with the at least one power module and may be configured to control at least one component of the at least one power module to generate alternating current having at least one of a specified frequency and a specified voltage. In addition, the system may be provided with an auxiliary module in electrical communication with the common alternating current bus that is configured to deliver electrical power to at least one auxiliary unit associated with the vehicle. The auxiliary unit may be at least one of the following: a lighting unit, a heating unit, an air conditioning unit, a ventilation unit, a drive unit, a radiator, a battery, a blower unit, a compressor unit, a control unit, a vehicle subsystem, a vehicle component, or any combination thereof. The auxiliary module may also include a transformer configured to transform the voltage of the current on the common alternating current bus to another specified voltage prior to delivery to the auxiliary unit.

The at least one power module may include at least one engine configured to drive the at least one generator. The speed of the at least one engine may be controlled through a governor in electrical communication with a generator control unit configured to receive speed feedback data from the at least one engine for use in controlling operation of the governor. The at least one power module may also include a voltage regulator in communication with the generator. The voltage of the current generated by the generator may be controlled through the voltage regulator in communication with a generator control unit configured to receive voltage feedback data from the generator for use in controlling operation of the voltage regulator.

The system of the present invention may also include a generator protection system that is configured to monitor and provide monitoring data representing at least one of the current, frequency, and voltage generated by the generator and delivered to the common alternating current bus. Based upon the monitoring data, the generator protection system may be configured to control at least one component of the at least one power module.

The system may also include a plurality of power modules in communication with the common alternating current bus through a respective contactor. Each of the plurality of power modules may include a respective generator control unit configured to: receive voltage feedback data from the at least one generator in the respective power module; receive speed feedback data from at least one engine configured to drive the at least one generator in the respective power module; control the voltage of the current generated by the generator through a voltage regulator in communication with the generator; and control the speed of the at least one engine through a governor in communication with the at least one engine. The control of the voltage may be based at least in part upon at least one of the following: the voltage feedback data, the voltage of the current on the common alternating current bus, a specified voltage, the voltage of the current generated by the generator in another power module, or any combination thereof. The control of the speed may be based at least in part upon at least one of the following: the speed feedback data, the frequency of the current on the common alternating current bus, a specified speed, the speed of at least one engine in another power module, or any combination thereof.

The at least one power conversion module may be in the form of an SCR configured to convert the alternating current to a specified direct current for delivery to the at least one motor. The specified direct current may be adjustable and based at least partially upon the desired operating conditions of the at least one motor.

The system may further include a plurality of power modules in communication with the common alternating current bus through a respective contactor. The controller may be configured to automatically control and share at least a portion of at least one of the power load and the voltage amongst at least two of the plurality of power modules. The at least one power module may include at least one engine configured to drive the at least one generator. The controller may include an engine control module configured to at least one of the following: monitor at least one parameter of the at least one engine, monitor at least one parameter of the at least one power module, determine the amount of power available to the vehicle, or any combination thereof.

The controller may include a system load module configured to at least one of the following: initiate at least one action of at least one component of the at least one power module, determine the usage time of at least one component of the at least one power module, determine the status of at least one component of the at least one power module, monitor at least one parameter of at least one component of the at least one power module, or any combination thereof. The controller may also include a protection control module configured to at least one of the following: monitor at least one parameter associated with a control device in communication with at least one component of the at least one power module, monitor at least one parameter of at least one component of the at least one power module, monitor at least one parameter of at least one component of the at least one power conversion module, initiate at least one action of at least one component of the at least one power module, or any combination thereof. The controller may further include a power conversion control module configured to at least one of the following: monitor at least one parameter of at least one component of the power conversion module, initiate at least one action of at least one component of the at least one power conversion module, or any combination thereof. The controller may also include at least one control module configured to at least one of the following: monitor at least one parameter of the vehicle, control at least one action of at least one component of the vehicle, or any combination thereof.

The present invention is also directed to a power generation and distribution system for providing power to at least one motor configured to drive a wheel of a vehicle. The system includes a plurality of power modules that each have at least one generator configured to generate alternating current having a frequency and voltage; at least one power conversion module in electrical communication with the plurality of power modules and configured to convert the alternating current to a specified direct current for delivery to the at least one motor; and a controller configured to communicate with and operatively control at least one component of each of the plurality of power modules. The controller is further configured to automatically control and share at least a portion of at least one of the power load and the voltage amongst at least two of the plurality of power modules.

In addition, the present invention is a power generation and distribution system for providing power to at least one motor configured to drive a wheel of a vehicle. The system includes at least one power module having at least one generator configured to generate alternating current having a frequency and voltage; at least one SCR configured to convert the alternating current to a specified direct current for delivery to the at least one motor; and a controller configured to communicate with and operatively control at least one component of the at least one SCR. The specified direct current is adjustable and based at least partially upon the desired operating conditions of the at least one motor.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE PRESENT INVENTION

Figure 1:
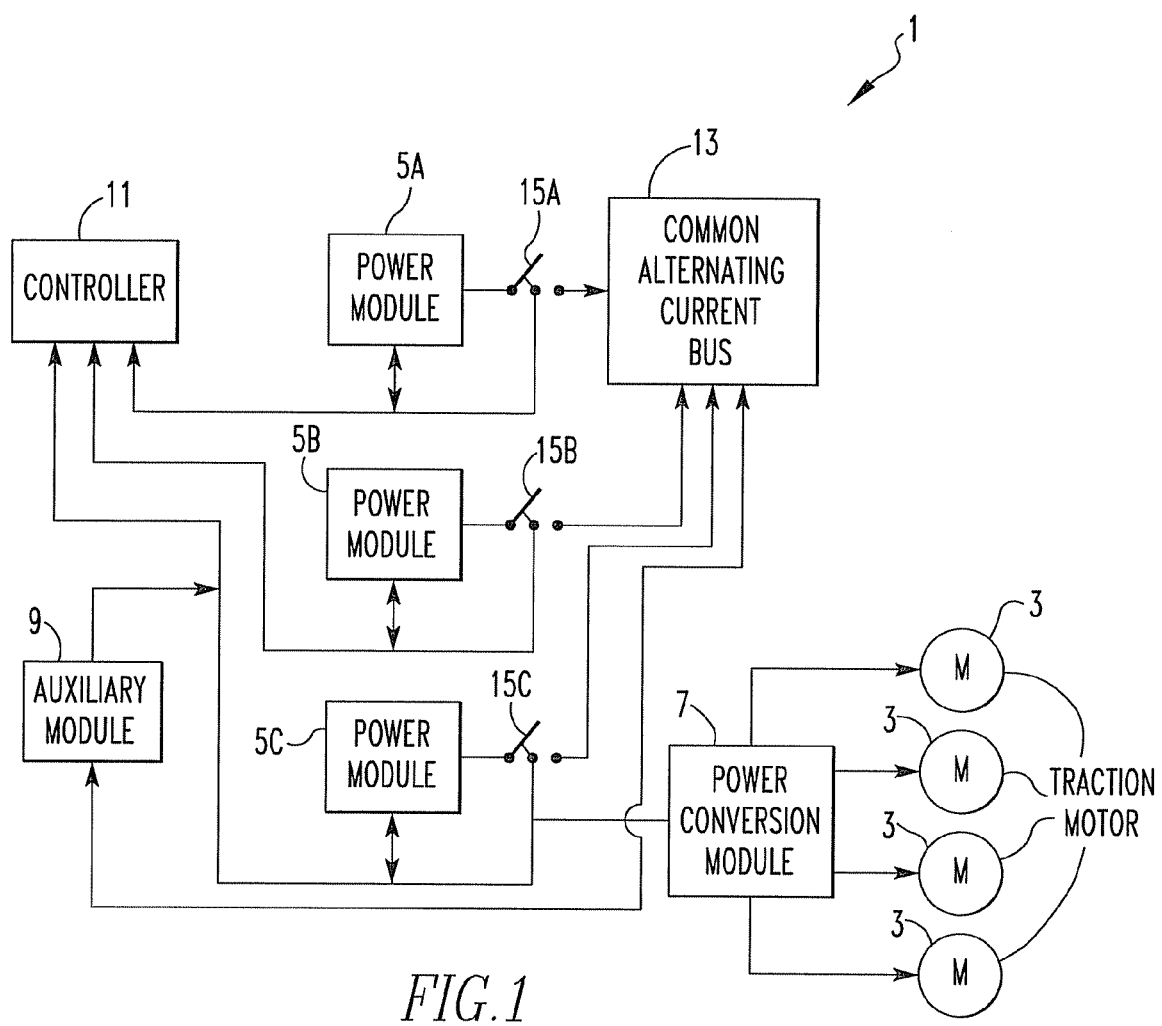
FIG. 1 is a schematic block diagram of a power generation and distribution system for a locomotive in accordance with the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

With reference to FIG. 1, a power generation and distribution system 1 for providing power to a plurality of traction motors 3 is configured to drive a wheel of a vehicle, such as a locomotive. System 1 includes five main electrical assemblies. These electrical assemblies are as follows: at least one, and desirably a plurality of power modules 5A, 5B, and 5C; at least one power conversion module 7; at least one auxiliary module 9; a Q-Tron Electronic System (QES) controller 11; and a plurality of traction motors 3. QES controller 11 is a programmable locomotive controller, such as the QES-III. System 1 is described hereinafter as including three power modules 5A, 5B, and 5C, however, this is not to be construed as limiting the present invention as any suitable number of power modules may be used.

System 1 also includes a common alternating current (AC) bus 13 in electrical communication with each of the power modules 5A, 5B, and 5C through a respective contactor 15A, 15B, and 15C and configured to receive the AC therefrom. The power conversion modules 7 are provided in electrical communication with the common AC bus 13 and configured to convert the AC to a specified direct current (DC) for delivery to traction motors 3. QES controller 11 is configured to communicate with and operatively control power modules 5A, 5B, and 5C, common AC bus 13, and power conversion modules 7.

Figure 2:
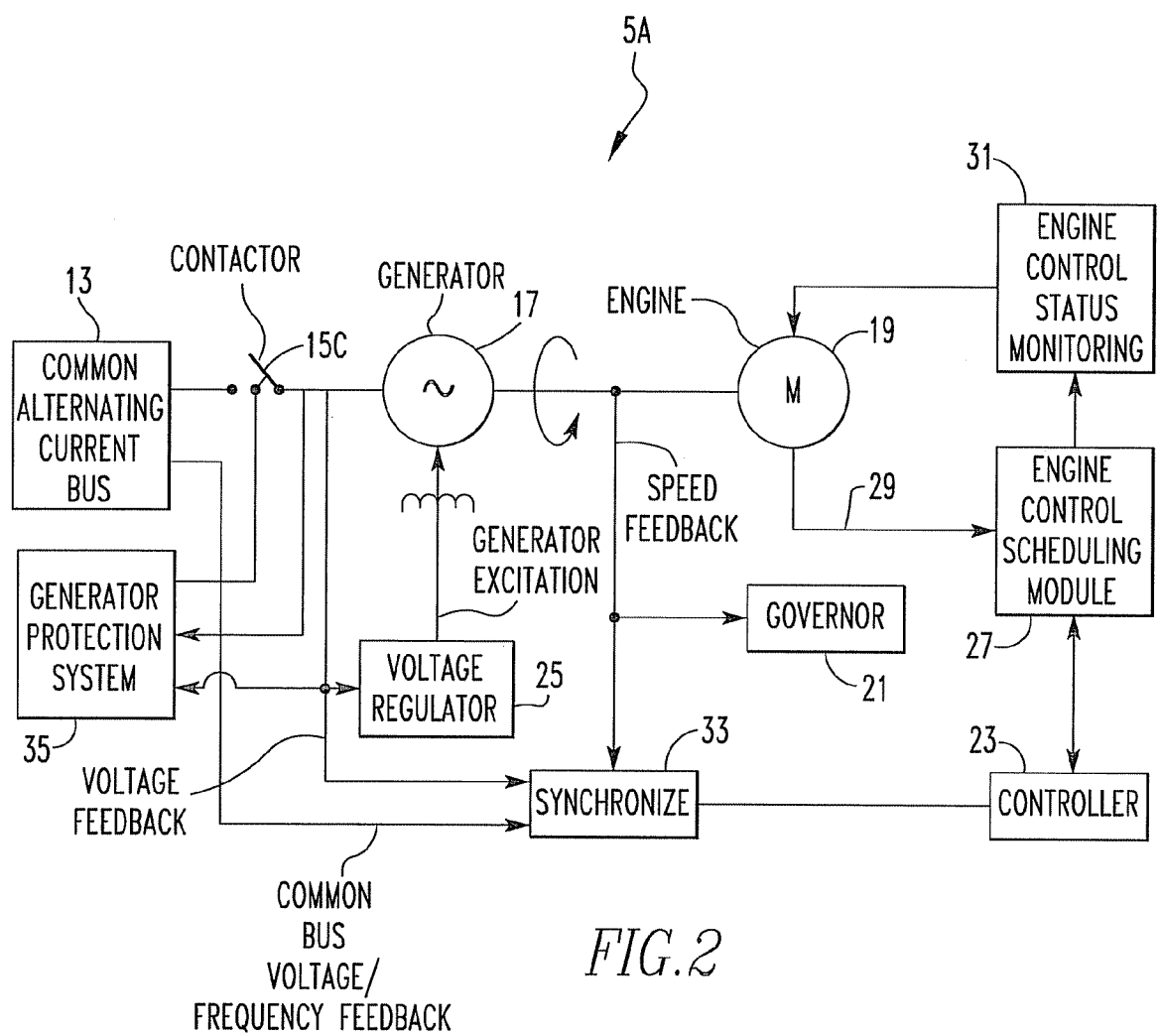
FIG. 2 is a schematic block diagram of one of the plurality of power modules of the software defined locomotive of FIG. 1.

With reference to FIG. 2 and with continuing reference to FIG. 1, each power module 5A, 5B, and 5C includes a generator 17 configured to generate AC power having a frequency and voltage. Each power module 5A, 5B, and 5C also includes an engine 19 configured to drive generator 17. The speed of engine 19 is controlled through a governor 21 in electrical communication with a generator control unit 23 configured to receive speed feedback data from engine 19 for use in controlling operation of governor 21. Each power module 5A, 5B, and 5C also includes a voltage regulator 25 in communication with generator 17. Voltage regulator 25 is configured to receive voltage and frequency feedback from generator 17, thereby forming a closed loop control system. This keeps the output voltage of generator 17 at a prescribed set point within the capabilities of system 1.

Each power module 5A, 5B, and 5C further includes an engine control scheduling module 27 that continuously monitors engine 19 through engine status data bus 29. When an electrical load on the locomotive increases to a point where energy from one of power modules 5A, 5B, and 5C is required, the engine control scheduling module 27 sends a start command to an engine control status monitoring module 31. Engine control status monitoring module 31 is configured to crank engine 19 and, upon a successful start, monitors engine 19. Engine 19 responds to speed control commands from governor 21, and receives a speed feedback signal from engine 19, thereby forming a closed loop control system. This allows engine 19 to run at a constant speed. The speed feedback signal is also applied to a synchronizer module 33. Synchronizer module 33 is provided to raise or lower an incoming voltage of generator 17 via voltage regulator 25 and frequency (i.e., speed) via governor 21 to match that of common AC bus 13. When the voltage and frequency are matched, power module 5A, 5B, or 5C is said to be in "sync" with the system and contactor 15A, 15B, or 15C is closed. Synchronizer module 33 communicates with synchronizer modules in each of the plurality of power modules making up system 1, and sends minute raise/lower commands to the governor and voltage regulator of each of the other power modules to keep the load balanced among power modules 5A, 5B, and 5C. Alternatively, if there are no other power modules on line, power module 5A, 5B, or 5C provides power to common AC bus 13 via contactor 15A, 15B, or 15C as soon as the generator voltage and frequency reach their nominal values. While each power module 5A, 5B, and 5C is supplying power to common AC bus 13, the generator voltage, frequency, and current are continuously monitored by a generator protection system 35. If any of these parameters are not within the optimum performance window, generator protection system 35 opens contactor 15A, 15B, or 15C, thus protecting power module 5A, 5B, or 5C from damage. In other words, generator protection system 35 is configured to monitor and provide monitoring data representing the current, frequency, and voltage generated by generator 17 and delivered to common AC bus 13. Based upon the monitoring data, generator protection system 35 is configured to control at least one component of power module 5A, 5B, or 5C.

Generator control unit 23 of each power module 5A, 5B, and 5C is configured to: receive voltage feedback data from generator 17 in the respective power module; receive speed feedback data from engine 19 configured to drive generator 17 in the respective power module; control the voltage of the current generated by generator 17 through voltage regulator 25 in communication with generator 17; and control the speed of engine 19 through governor 21. The control of the voltage is based, at least in part, upon one or more of the following: the voltage feedback data, the voltage of the current on common AC bus 13, a specified voltage, the voltage of the current generated by generator 17 in another power module, or any combination thereof. The control of the speed is based, at least in part, upon at least one of the following: the speed feedback data, the frequency of the current on common AC bus 13, a specified speed, the speed of engine 19 in another power module, or any combination thereof.

Power conversion modules 7 are provided to receive power from common AC bus 13, and then provide a controlled DC current to traction motors 3. The ability to rapidly adjust the traction motor torque (tractive effort) is performed by adjusting the DC output current of power conversion module 7. Output DC voltage of power conversion module 7 is varied to meet the needs of traction motor 3 as determined by the speed and tractive load conditions. Motor speed conditions are monitored for overspeed and stall to prevent motor damage. Power conversion module 7 may be an SCR configured to convert the alternating current to a specified direct current for delivery to traction motor 3. The specified direct current is adjustable and based at least partially upon the desired operating conditions of traction motor 3.

Output of power conversion module 7 is protected from inversion faults caused by motor overvoltage conditions through limitation of the motor current for a given speed. The motor back or counter electromotive force (EMF) is a function of motor speed and current. Commutator protection or preservation lessens the damage from severe arcing and flashover. Reduction of commutator film loss is achieved by limiting the rate of change of motor current by power conversion module 7 to a value suitable for the motor operating conditions of speed, voltage, and current. Reducing the transient inter-bar commutator voltages lessens the conditions that precipitate commutator arcing. Finally, reduction or removal of the motor current during periods of serious field disturbances (flashover) caused by motor magnetic anomalies will minimize commutator damage and repair.

As mentioned hereinabove, system 1 is provided with auxiliary modules 9 provided in electrical communication with common AC bus 13. Common AC bus 13 is configured to deliver electrical power to an auxiliary unit of auxiliary module 9 associated with the vehicle. The auxiliary unit may be at least one of the following: a lighting unit, a heating unit, an air conditioning unit, a ventilation unit, a drive unit, a radiator, a battery, a blower unit, a compressor unit, a control unit, a vehicle subsystem, or a vehicle component. Auxiliary module 9 also includes a transformer configured to transform the voltage of the current on common AC bus 13 to another specified voltage prior to delivery to the auxiliary unit. Since the voltage of common AC bus 13 is an industry standard voltage and frequency, the auxiliary units of auxiliary module 9 are readily available from many different manufacturers. In the event an auxiliary unit is not compatible with the voltage of common AC bus 13, the voltage can be easily transformed by the transformer of auxiliary module 9.

Finally, system 1 includes QES controller 11, which coordinates the activities of the distributed processors throughout the locomotive, causing the distributed locomotive control systems to function as one unified process. More specifically, QES controller 11 includes a variety of modules for performing several different control functions. For instance, QES controller 11 includes a protection control module configured to: monitor at least one parameter associated with a control device in communication with at least one component of power modules 5A, 5B, and 5C; monitor at least one parameter of at least one component of power modules 5A, 5B, and 5C; monitor at least one parameter of at least one component of power conversion module 7; and initiate at least one action of at least one component of power modules 5A, 5B, and 5C. QES controller 11 also includes a power conversion control module configured to at least one of the following: monitor at least one parameter of at least one component of power conversion module 7; and initiate at least one action of at least one component of power conversion module 7. Finally, QES controller 11 includes at least one control module configured to at least one of the following: monitor at least one parameter of the vehicle; and control at least one action of at least one component of the vehicle. Each of these functions will be described in greater detail hereinafter with reference to the flow diagrams of FIGS. 3A, 3B, 4, 5, 6A, 6B, 7, 8A, and 8B.

The operation of system 1 of the present invention will be discussed hereinafter with reference to the flow diagrams of FIGS. 3A, 3B, 4, 5, 6A, 6B, 7, 8A, and 8B.

The main program, as illustrated by blocks A1 through H1, is provided to continuously check whether the control switch is in run/start (block B1). If the control switch is in run/start, the main program sets the Initial Light Off (ILO) flag and processes the Engine Module (block D1), System Load Module (block E1), SCR Module (block F1), and Locomotive Control Module (block G1). The main program continuously loops through these modules unless the locomotive is being shut down (see block H1). If the locomotive is being shutdown, the engines are shut down and the main program returns to the start position (see block A1).

The Engine Module (block D1) includes a plurality of engine modules (blocks D2, D13, and D14) and an AC contactor auxiliary contact X (ACAX) module (block D15). The ACAX is configured to open or close when its associated generator comes on or off line. Accordingly, the ACAX provides an indication whether generator X is supplying power to system 1.

Figure 3A:
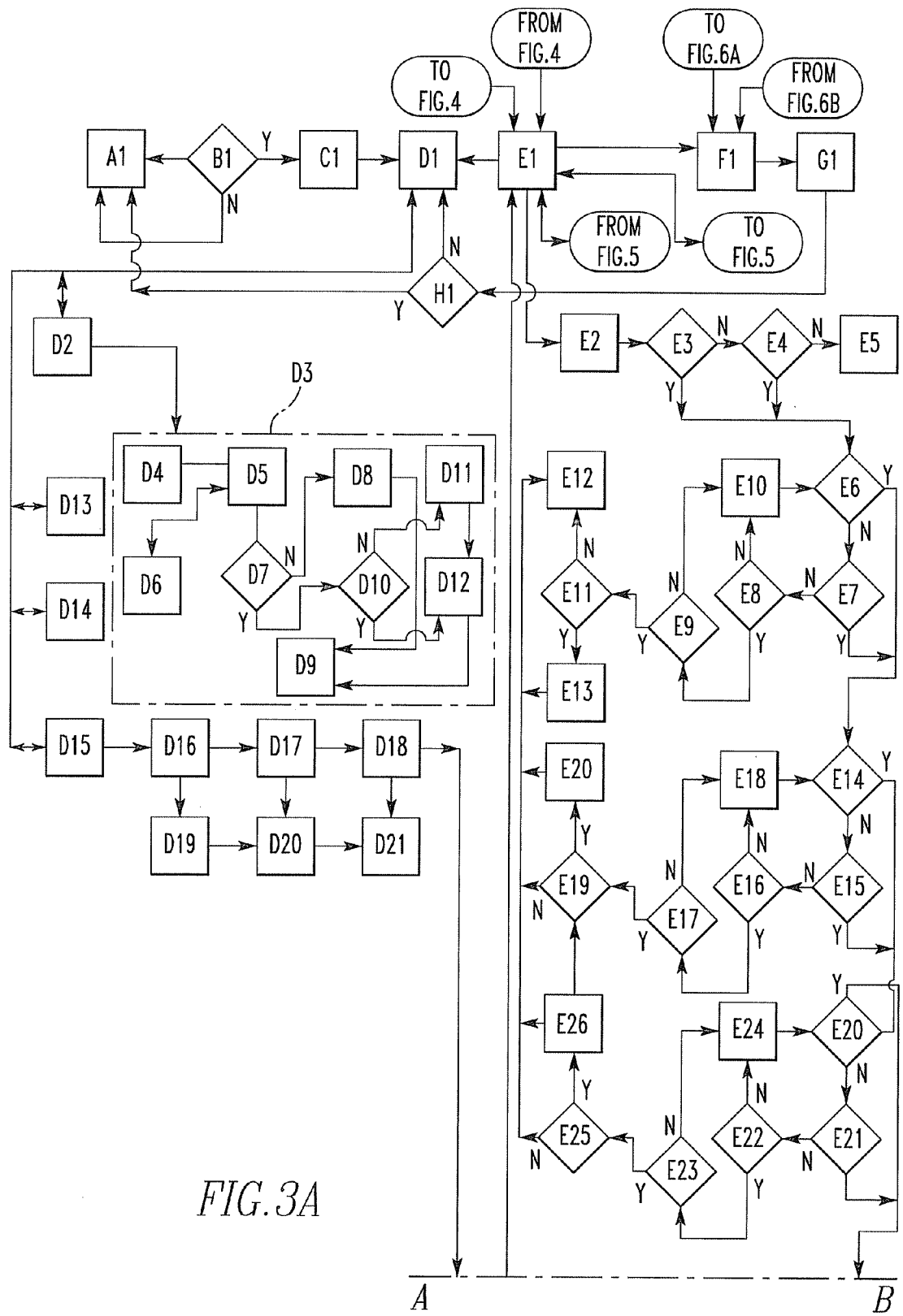
FIGS. 3A, 3B, 4, 5, 6A, 6B, 7, 8A, and 8B are flow diagrams illustrating the process performed by the power generation and distribution system for a locomotive of FIG. 1.
Figure 3B:
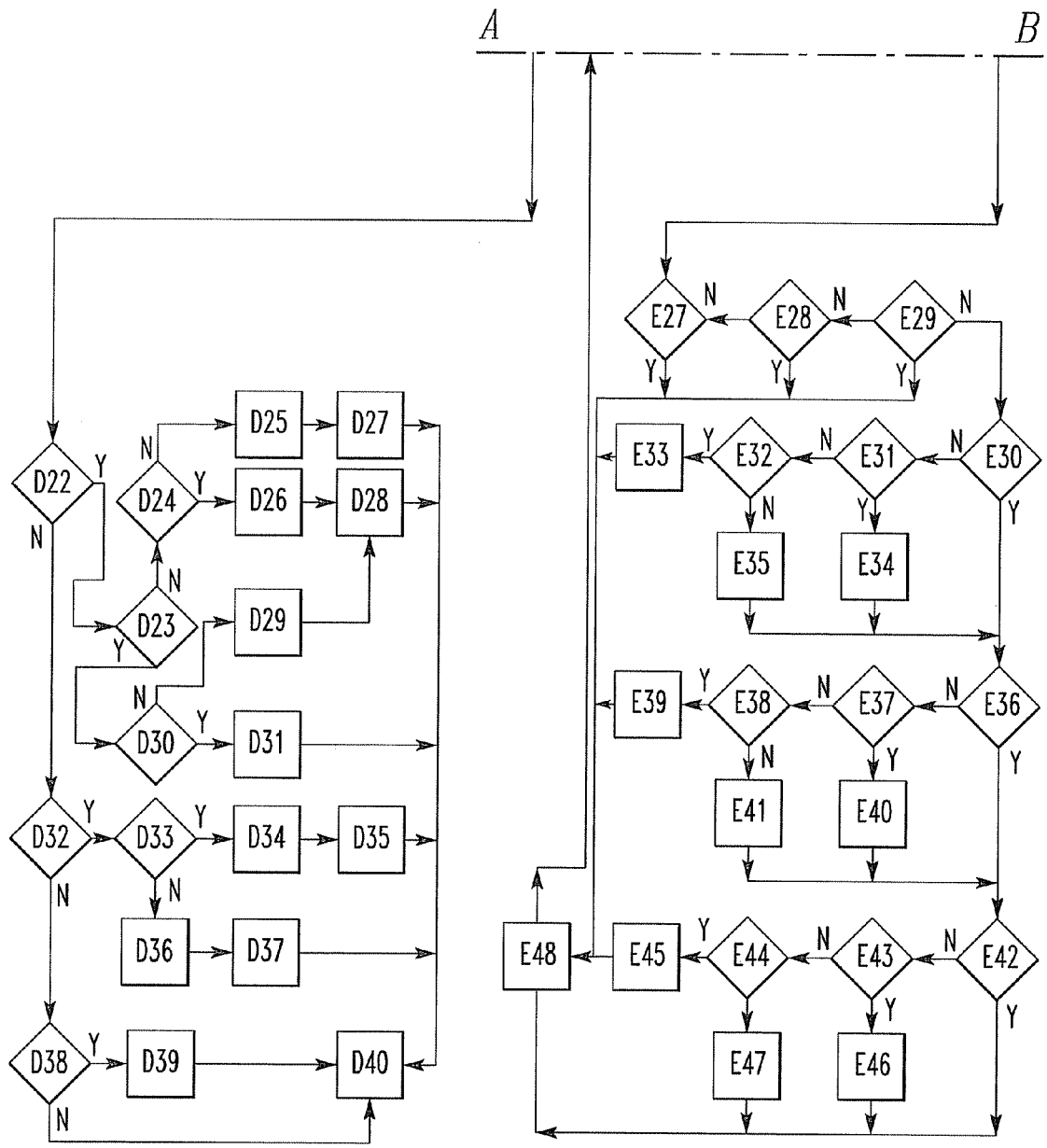

The ACAX module (block D15) is described by blocks D15 through D40 of FIGS. 3A and 3B. The purpose of the ACAX module (block D15) is to determine how many power modules 5 are online and the amount of power available to the locomotive. AC contactor 15A, 15B, and 15C status of each power module 5A, 5B, and 5C is checked to see if it is closed (see blocks D16 through D18). If the contactors are closed, the ACAX auxiliary contact is set at blocks D19 through D21. Thereafter, the program determines which power modules 5A, 5B, and 5C are on line. At block D22, it is determined whether ACAX1 is closed. If ACAX1 is closed, ACAX2 is checked at block D23. If ACAX2 is open, ACAX3 is checked at block D24. If ACAX3 is closed, Units 1 and 3, corresponding to power modules 5A and 5C, Online and the Two Units Online flags are set (see blocks D26 and D28) and control returns to the Engine Module at block D40. If ACAX 3 is not closed, the Unit 1 Online flag (block D25) and 1 Unit Online flags (block D27) are set and control returns to the Engine Module at block D40.

If it is determined at block D23 that ACAX2 is closed, ACAX3 is checked at block D30. If ACAX3 is closed, the All Online flag (block D31) is set and control returns to the Engine Module at block D40. If ACAX3 is not closed the Units 1 and 2, corresponding to power modules 5A and 5B, the Online and the Two Units Online flags are set (see blocks D29 and D28, respectively) and control is returned to the Engine Module at block D40. If it is determined at block 22 that ACAX1 is open, the program moves to block D32 to determine the status of ACAX2.

If ACAX2 is closed, the ACAX3 module is checked at block D33. If ACAX3 is closed, the Units 2 and 3, corresponding to power modules 5B and 5C, the Online and the Two Units Online flags (blocks D34 and D35, respectively) are set and control returns to the Engine Module at block D40. If ACAX3 is not closed, the Unit 2 Online, corresponding to power module 5B, and 1 Unit Online flags (blocks D36 and D37, respectively) are set and control returns to the Engine Module at block D40. If ACAX2 is open at block D32, ACAX3 is checked at block D38. If ACAX3 is closed, the Unit 3 Online, corresponding to power module 5C, and 1 Unit Online flags (blocks D39 and D37, respectively) are set and control returns to the Engine Module at block D40. If ACAX3 is found to be open at block D38, control returns to the Engine Module at block D40. After control has returned to the Engine Module at block D40, control passes back to the main program (see blocks A1 through H1) to be transferred to the System Load Module (block E1).

The System Load Module (block E1) includes three sub-modules. These are the Engine Start Module (block E2), the GCP31 Module (block E49), and the Protection Module (Block F2).

The purpose of the Engine Start Module (block E2) is to start the engine with the fewest number of hours whenever an engine is to be added to common AC bus 13. The Engine Start Module (block E2) is provided by blocks E2 to E48 of FIGS.

3A and 3B. When control passes to the Engine Start Module at block E2, the status of the ILO flag is checked at block E3. If the ILO flag is not set, the Add Unit flag is checked at block E4, if the Add Unit flag is not set, control returns to the System Load Module at block E5 to be transferred to the GCP31 Module (block E49). If either the ILO or Add Unit flags (blocks E3 and E4, respectively) are set, the Engine 1 Unit Lockout flag is checked at block E6. If the Engine 1 Unit Lockout flag is set, the Engine 1 logic is bypassed. If the Engine 1 Unit Lockout is not set, the engine is checked to see if it is running or flag 1 is set at block E7. If these flags are clear, the hours of Engine 1 are compared to the hours of Engines 2 and 3 at blocks E8 and E9, respectively. If the hours of Engine 1 are less than Engines 2 and 3, and the Start Enable flag (set at block D11) is set (determined at block E11), control passes to the Start Engine 1 Module (block E13) and then returns to the System Load Module at block E12. If the Start Enable flag is found to not be set at block E11, an Error Message is sent to an operator console, the Engine 1 is Locked Out, and control returns to the System Load Module at block E12 for transfer to the GCP31 Module (block E49). If the hours of Engine 1 are greater than Engines 2 and 3, flag 1 is set at block E10 and then the Engine 1 Unit Lockout flag is checked at block E6. Since the Engine 1 Unit Lockout flag is now set, the Engine 1 logic is bypassed.

The Engine 2 Unit Lockout flag is then checked at block E14. If the Engine 2 Unit Lockout flag is set, the Engine 2 logic is bypassed. If the Engine 2 Unit Lockout is not set, the engine is checked to see if it is running or flag 2 is set at block E15. If these flags are clear, the hours of Engine 2 are compared to the hours of Engines 1 and 3 at blocks E16 and E17, respectively. If the hours of Engine 2 are less than Engines 1 and 3, and the Start Enable flag (set at block D11) is set (determined at block E19), control passes to the Start Engine 2 Module (block E20) and then returns to the System Load Module at block E12. If the Start Enable flag is found to not be set at block E19, an Error Message is sent to the operator console, the Engine 2 is Locked Out, and control returns to the System Load Module at block E12 for transfer to the GCP31 Module (block E49). If the hours of Engine 2 are greater than Engines 1 and 3, flag 2 is set at block E10 and then the Engine 2 Unit Lockout flag is checked at block E6. Since the Engine 2 Unit Lockout flag is now set, the Engine 2 logic is bypassed.

The Engine 3 Unit Lockout flag is checked at block E20. If the Engine 3 Unit Lockout flag is set, the Engine 3 logic is bypassed. If the Engine 3 Unit Lockout is not set, the engine is checked to see if it is running or flag 3 is set at block E21. If these flags are clear, the hours of Engine 3 are compared to the hours of Engines 1 and 2 at blocks E22 and E23, respectively. If the hours of Engine 3 are less than Engines 1 and 2, and the Start Enable flag (set at block D11) is set (determined at block E25), control passes to the Start Engine 3 Module (block E26) and then returns to the System Load Module at block E12. If the Start Enable flag is found to not be set at block E25, an Error Message is sent to the operator console, the Engine 3 is Locked Out, and control returns to the System Load Module at block E12 for transfer to the GCP31 Module (block E49). If the hours of Engine 3 are greater than Engines 1 and 2, flag 3 is set at block E24 and then the Engine 3 Unit Lockout flag is checked at block E20. Since the Engine 3 Unit Lockout flag is now set, the Engine 1 logic is bypassed.

Once the Engine 1 logic, Engine 2 logic, and Engine 3 logic are each bypassed, it is determined whether each engine has started at blocks E27 through E29. If none of the engines are started, it is first determined whether Engine 1 is running at block E30. If Engine 1 is not running, it is determined whether Engine 1 is locked out at block E31. If Engine 1 is locked out, an Error Message is sent to the operator console at block E34. If Engine 1 is not locked out, it is then determined whether flag 1 has been set at block E32. If flag 1 has not been set, an Error Message is sent to the operator console at block E35. If flag 1 has been set, control passes to the Start Engine 1 Module (block E33). Thereafter, all flags are cleared at block E48 and control then returns to the System Load Module (block E1). If it is determined at block E30 that Engine 1 is running, it is then determined if Engine 2 is running at block E36.

If Engine 2 is not running, it is determined whether Engine 2 is locked out at block E37. If Engine 2 is locked out, an Error Message is sent to the operator console at block E40. If Engine 2 is not locked out, it is then determined whether flag 2 has been set at block E38. If flag 2 has not been set, an Error Message is sent to the operator console at block E41. If flag 2 has been set, control passes to the Start Engine 2 Module (block E39). Thereafter, all flags are cleared at block E48 and control then returns to the System Load Module (block E1). If it is determined at block E36 that Engine 2 is running, it is then determined if Engine 3 is running at block E42.

If Engine 3 is not running, it is determined whether Engine 3 is locked out at block E43. If Engine 3 is locked out, an Error Message is sent to the operator console at block E46. If Engine 3 is not locked out, it is then determined whether flag 3 has been set at block E44. If flag 3 has not been set, an Error Message is sent to the operator console at block E47. If flag 3 has been set, control passes to the Start Engine 3 Module (block E45). Thereafter, all flags are cleared at block E48 and control then returns to the System Load Module (block E1). Finally, if it is determined at blocks E27 through E29 that one of Engines 1-3 is running, all flags are cleared at block E48 and control then returns to the System Load Module (block E1).

Figure 4:
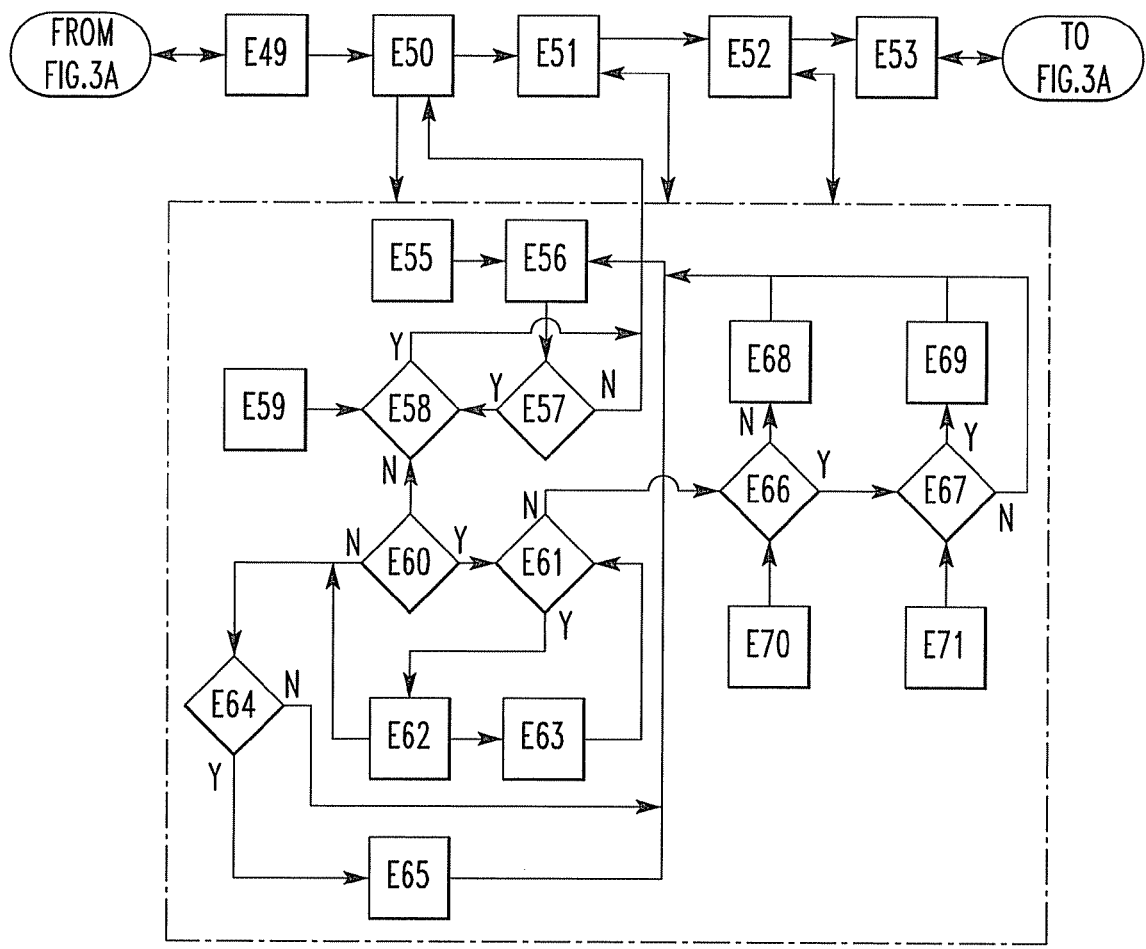

With reference to FIG. 4 and with continuing reference to FIGS. 1, 2, 3A, and 3B, the GCP31 Module as denoted by blocks E49 to E53 includes an identical GCP31_X Module (blocks E50 to E52) for each engine. Each GCP31_X Module continuously checks to see if its respective engine is running.

The following example is provided for the GCP31_1 Module which continuously checks to see if Engine 1 is running. The module begins at block E55. Thereafter, at block E56, the Add Another Unit flag 1 is cleared. Next, it is determined whether Engine 1 is running at block E57. If Engine 1 is not running, control is passed back to the GCP31 Module. If Engine 1 is running, it is then determined whether the engine is online at block E58. This determination is made by receiving an input from the ACAX Unit 1 of whether the contactor 15A is closed (see block E59). If Engine 1 is online, control is passed back to the GCP31 Module. However, if Engine 1 is not online, the engine RPM is checked at block E60. If the RPM of Engine 1 is at 1800 RPM, and the throttle is at notch 1 or 5 as determined at block E61, the engine RPM is reduced to idle at block E62. The notch of the throttle is determined by the control stand notch provided at block E63. If the throttle is not at notch 1 or 5, it is again determined whether Engine 1 is online at block E66. This determination is made by receiving an input from the ACAX Unit 1 of whether the contactor 15A is closed (see block E70). If Engine 1 is not online, a "Go Online" Message is provided (block E68) and control is passed back to the GCP31 Module. If Engine 1 is online, it is then determined whether the throttle is at notch 2 or 6 at block E67. The notch of the throttle is determined by the control stand notch provided at block E71. If the throttle is at notch 2 or 6, the Add Another Unit flag will be set at block E69 and control will then be returned to the GCP31 Module. In addition, if the throttle is not at notch 2 or 6, control is returned to the GCP31 Module. In addition, if Engine 1 is running at idle, the cool down timer is checked at block E64. If time has expired, the engine will shut down at block E65. Control then returns to the GCP31 Module for transfer to the GCP31_2 Module (block 51) for Engine 2. Once the GCP31_2 Module (block 51) is completed, control returns to the GCP31 Module for transfer to the GCP31_3 Module (block 52) for Engine 3. After the GCP31_3 Module (block 52) has been completed, control returns to the GCP31 Module for transfer to the System Load Module (block E1) for transfer to the Protection Module (block F2).

Figure 5:
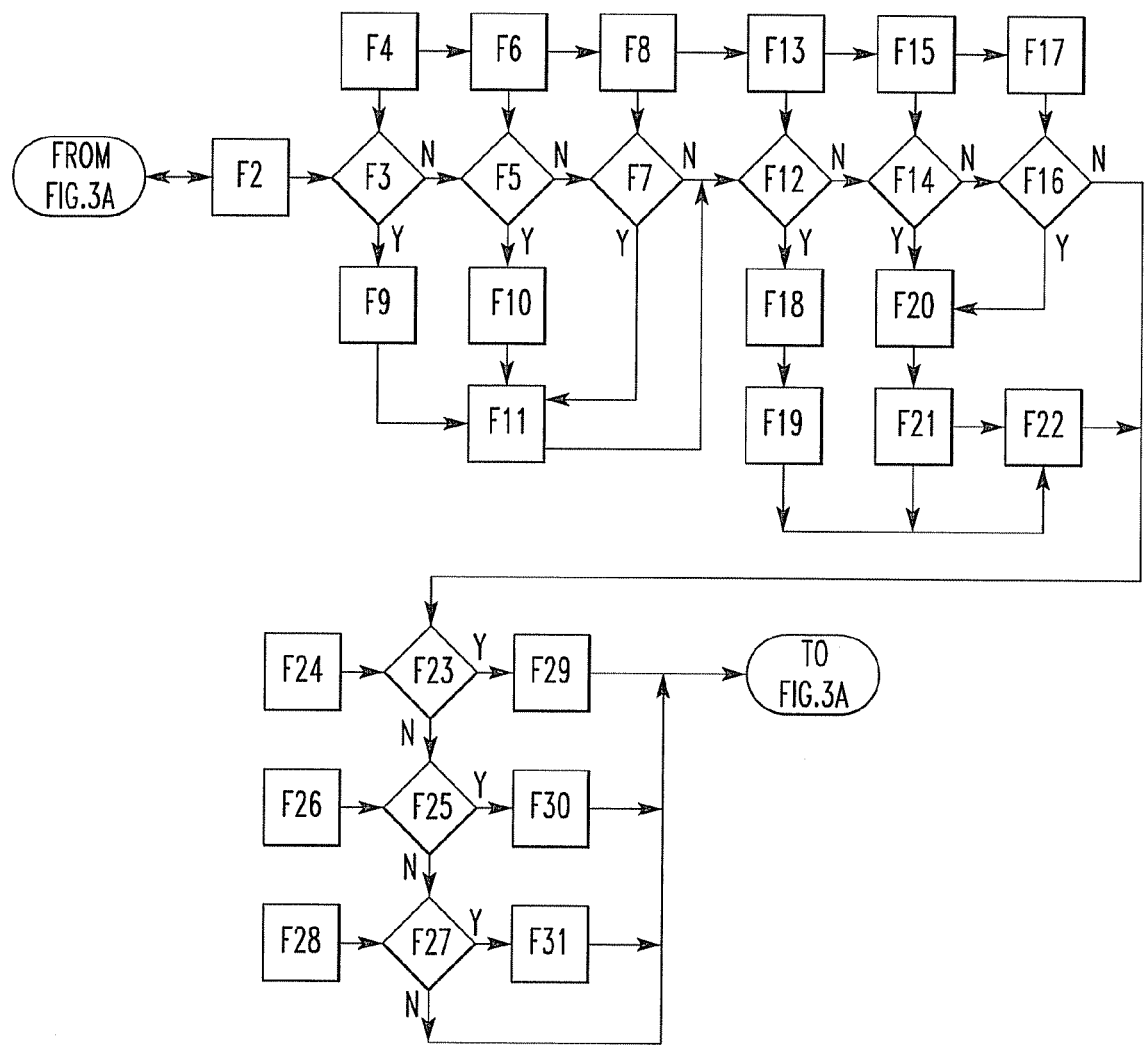
Figure 6A:
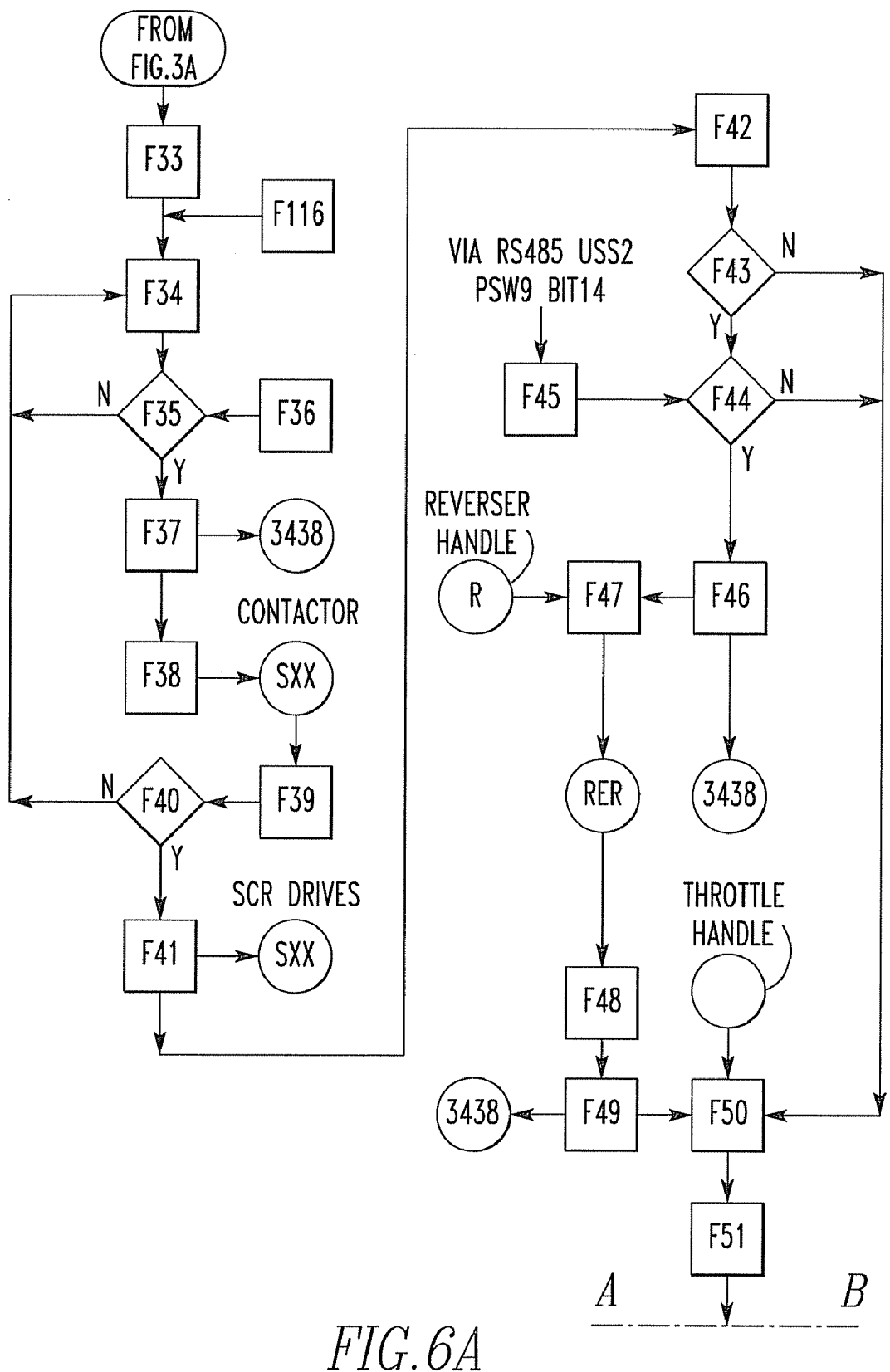
Figure 6B:
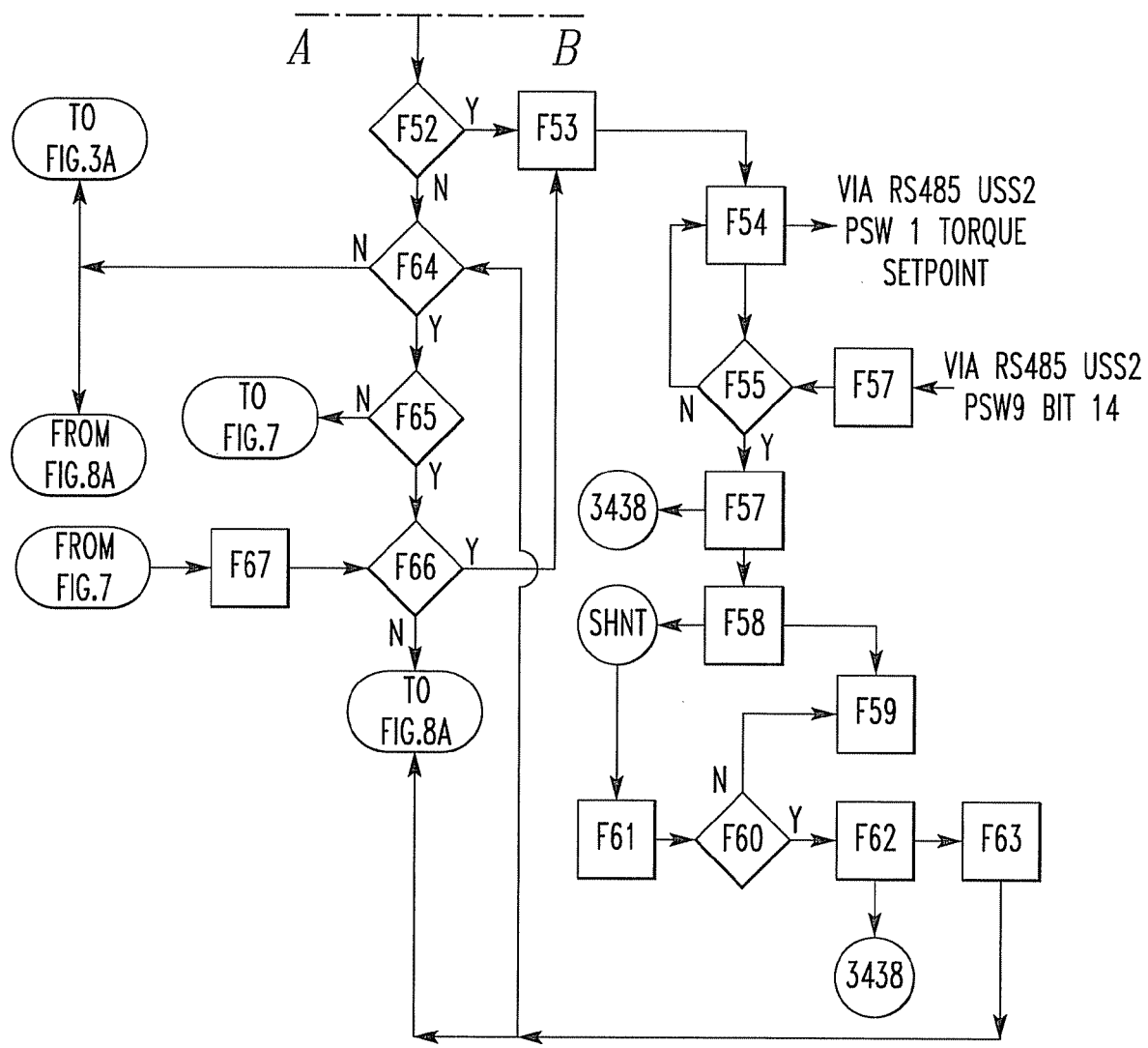

With reference to FIG. 5 and with continuing reference to FIGS. 1, 2, 3A, 3B, and 4, the Protection Module (block F2) is provided by blocks F2 to F31. The Protection Module (block F2) checks various aspects of each of power modules 5A, 5B, and 5C. First, at block F3, the protective relay of the power module is tested on an input from block F4. The protective relays continuously monitor voltage, current, frequency, and power, and is configured to trip if a dangerous condition exists. If there is a fault with the protective relay, a protective relay fault flag is set at block F9 and an Error Message is sent to the operator console stating that a hardware failure has occurred at block F11. If there is no fault with the protective relay, the microprocessor status of each intelligent electrical device (IED) is checked at block F5 based on an input from block F6. If a fault with an IED has occurred, an IED fault flag is set at block F10 and an Error Message is sent to the operator console at block F11 stating that a hardware failure has occurred. A failed IED is a fatal error for power modules 5A, 5B, or 5C, and the power module with the failed IED is tripped immediately if online and locked out. Finally, it is determined whether each GCP31 Module is ready at block F7 based on input from block F8. If one of the GCP31 modules is not ready, an Error Message is sent to the operator console at block F11 stating that a hardware failure has occurred.

The Protection Module also checks several other components of power modules 5A, 5B, and 5C. For instance, based on an emergency fuel cutoff (EFCO) input provided at block F13, it is determined whether the EFCO button has been pressed at block F12. If the EFCO button is pressed, a message stating the EFCO button is pressed is sent at block F18 to the operator console and all units are shutdown at block F19. A message is then provided to the operator interface at block F22 that electrical generator trip reset is required. At block F14 it is determined whether an engine fault has occurred based on an input from block F15. In addition, at block F16, it is determined whether an electrical problem exists based on an input from the protective relay provided at block F17. If an engine fault, such as High Jacket Water Temperature is detected, or if an electrical problem occurs, such as an over current or unbalanced voltages, the affected Engine Lockout flag is set at block F20, the affected engine is stopped at block F21, and an Error Message stating a generator problem exists is sent to the operator console at block F22.

Non-critical generator alarms such as Over/Under Frequency and Over/Under Voltage simply notify the operator that a discrepancy exists. More specifically, at block F25, the Over/Under Voltage Relay is checked based on an input from block F26. If a fault exists, a message is sent to the operator console stating that the engine fault relay (EFR) has tripped at block F30. This causes the engine to come off line. Similarly, at block F27, the Over/Under Frequency Relay is checked based on an input from block F28. If a fault exists, a message is sent to the operator console stating that the EFR has tripped at block F31. On the other hand, an SCR over current causes the SCR to trip and leaves the generator and the surviving SCR online. Accordingly, if SCR overload occurs at block F23 based on an SCR over current from block F24, a trip SCR flag is set at block F29. After checking the last power module, control returns to the System Load Module (block E1) for transfer to the SCR Module (block F1).

With reference to FIGS. 6A, 6B, 7, 8A, and 8B and with continuing reference to FIGS. 1, 2, 3A, 3B, 4 and 5, the SCR Module (block F1) is illustrated as blocks F33 through F116. The SCR Module is the most complex module and includes two identical sub-modules in the SCR Module (block F1) designated as blocks F33 and F116.

Each SCR sub-module (blocks F33 and F116) begins with a Series Module (block F34). Series Module (block F34) is provided to insure that the current of the traction motor 3 is zero before the SCR drive of power conversion module 7 allows contactors 15A, 15B, and 15C to be switched. This insures contactors 15A, 15B, and 15C are always switched under a zero current condition. Control first passes through a check for zero current at block F35 based on a drive current from an SCR drive provided at block F36. The control loops until the drive current is zero. When the drive current is zero, a drive enable flag is cleared at block F37. Next the Series Module will issue a command at block F38 to a series contactor (SXX) contactor to close. The SXX is a series contactor where XX is either 13 or 24 depending on which axles are being referenced. The SXX place traction motors 3 in series. Auxiliary contacts of the affected contactor (block F39) will inform the Series Module the contactor has been closed at block F40. If the contactor is not closed, control will continuously loop until the contactor is confirmed closed. Once the contactor is closed, the drive enable signal will be asserted at block F41, and control will be returned to the SCR module (block F33) for transfer to Throttle and Reverser Module (block F42).

The purpose of the Throttle and Reverser Module (block F42) is to process the control stand information and output a torque command to the SCR drives of power conversion modules 7. Unless the locomotive is at zero speed as determined at block F43 and zero current as determined at block F44 based on an input regarding armature amperage provided by block F45, the reverser handle's position is ignored and control passes to the throttle position to torque algorithm at block F50. The throttle position to torque algorithm passes a torque command to the SCR drives via a USS protocol. This is the SCR drive manufacturer's proprietary protocol, which is used for communication between the SCR drives of power conversion modules 7 and QES controller 11. The torque command increases or decreases the force applied by traction motors 3 to the wheels of the vehicle at block F51. If the locomotive is at zero speed and zero current, the drive enable signal is removed at block F46 and the reverser handle's position is passed at block F47 to the Reverser Relay (RER). The auxiliary contacts of the RER confirm the commanded position at block F48. Next, at block F49, the drive enable flag is reasserted and control is passed to the throttle position to torque algorithm at block F50. When the Throttle and Reverser Module is complete, control will be returned to the SCR Module (block F33) to determine if the locomotive is at a motor shunting point at block F52.

If the locomotive is at a shunting point, as determined by the SCR Module (block F33), control passes to a Shunting Module (block F53). The Shunting Module (block F53) commands the torque reference output to the SCR drive of the power conversion module to become zero at block F54. Control loops through the zero torque command until the drive current is zero (see blocks F55 and F56). When the drive current is zero, the drive enable signal is removed at block F57 and the Shunting Module picks up the shunting contactor at block F58. The SCR drive is informed that the shunting contactor has been picked up by auxiliary contacts at block F61. If the auxiliary contacts do not close as determined at block F60, an error message is sent to the operator's console at block F59 and the shunt command is reissued. When the shunt command has been verified, the drive is enabled at block F62 and the torque is adjusted for a "bumpless" transfer at block F63. A "bumpless" transfer occurs when a generator is brought on or off line. During a "bumpless" transfer, the voltage and frequency of the incoming generator is matched to the generators already on common AC bus 13. When the contactor is closed, the bus voltage and frequency do not vary. When a generator is taken off line, it is gradually unloaded, with the remaining generators taking up the load. When the contactor opens, the system disturbance is at a minimum because the remaining generators have taken up all the slack. Thereafter, control is returned to the SCR Module (block F33).

When control is returned to the SCR Module (block F33), the speed of the locomotive is compared to a transition speed at block F64. The transition speed is a speed at which the locomotive goes from one traction configuration to another. For example, a locomotive may have four (4) transition points. The first point (about 6 MPH) is the transition from series parallel to series parallel shunt. At about 12 MPH, there is a transition from series parallel shunt to parallel. At about 25 MPH, there is a transition from parallel to parallel shunt. Finally, when the locomotive is slowing down, it goes through four transition changes from parallel shunt back to series parallel. The preceding example is for explanatory purposes only and is not to be construed as limiting the present invention to any particular transition speed.

If the speed of the locomotive is above or below the transition speed, control loops back through the error module and returns to the SCR Module (block F33) for transfer to the SCR Module (block F116). If control was in the SCR Module (block F116), control is returned to the Main Program. If the locomotive is at the transition speed, the series to parallel (SPM) flag will be checked at block F65. This flag is set whenever the locomotive is undergoing a transition from series to parallel. If the SPM flag has been set, the locomotive's speed is checked to ascertain if a shunting point has been reached at block F66. If a shunting point has been reached, control passes through the Shunting Module (block F53) as described hereinabove. If the locomotive's speed is a constant or increasing value, control is returned to the SCR Module (block F33) for transfer either to SCR Module (block F116) or the Main Program.

Figure 7:
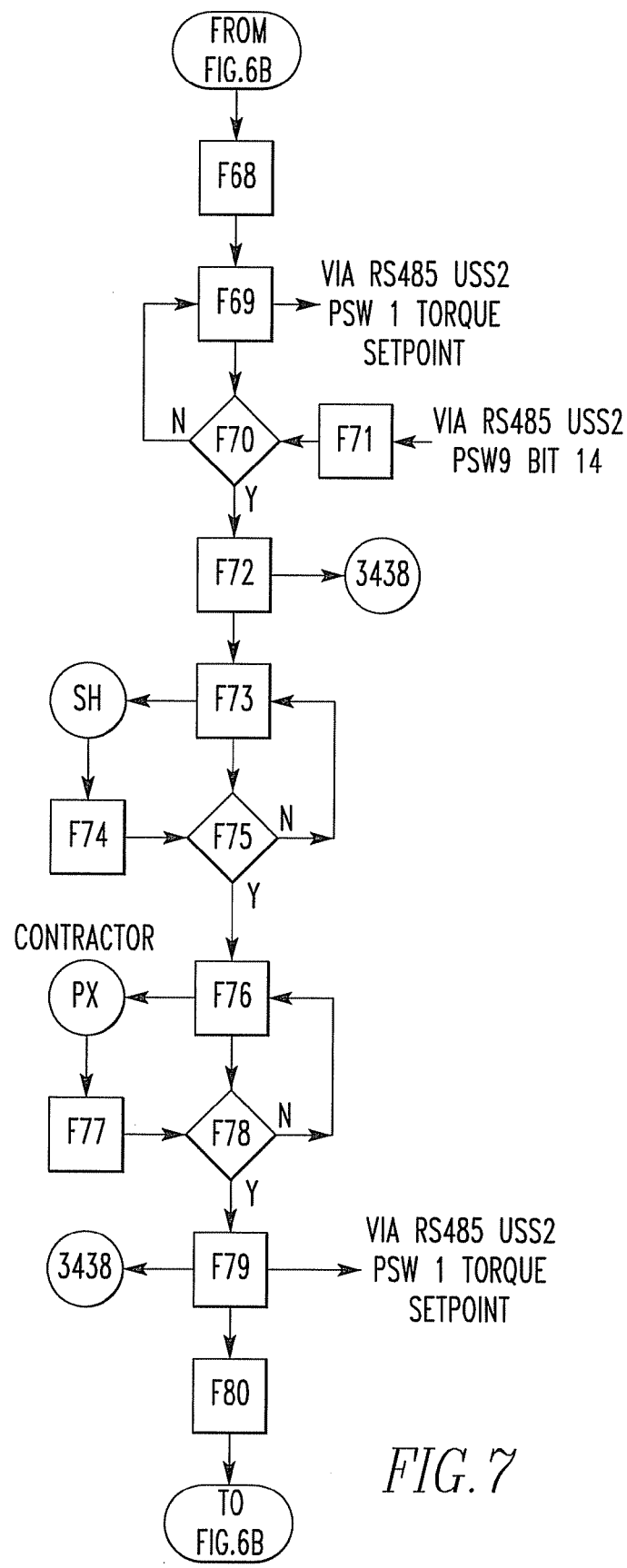

With specific reference to FIG. 7, if the SPM flag has not been set as determined at block F65, control passes to the Series-to-Parallel Module (block F68). The purpose of the SPM module is to set up a traction circuit to operate in parallel. The torque signal to the SCR drives is commanded to be zero at block F69. In addition, the armature current is monitored at blocks F70 and F71 until the armature current reaches zero. When the armature current is zero, the drive enable signal is removed from the drive at block F72. Next, the shunt contactor is tripped at block F73. If the shunt contactor does not trip as determined at block F75, the command will be repeated and an Error Message will be sent to the operator's console. If the shunt contactor does trip, its auxiliary contacts send confirmation at block F74 to the SCR drive. Once the shunt contactor has opened, the traction circuit is set up to run in parallel by closing the associated parallel contactors (PX) at block F76. Auxiliary contacts of the parallel contactors (PX) send confirmation of the parallel configuration of the traction motor circuits to the SCR drive at block F77. Once the parallel confirmation has been received, the drive enable signal is reasserted at block F79 and the torque is adjusted for a "bumpless" transfer at block F80. If the parallel confirmation is not received as determined at block F78, the parallel command is repeated. Control is then returned to the SCR module where the SPM flag will be set, and the DS1 and parallel to series module (PSM) flags will be cleared at block F67. The DS1 flag is set when the first transition point is entered for the first time. If the locomotive is at a shunting point, control is transferred to the Shunting Module (block F53) as described hereinabove. Control then passes to a decreasing speed check block F81 as illustrated in FIGS. 8A and 8B.

Figure 8A:
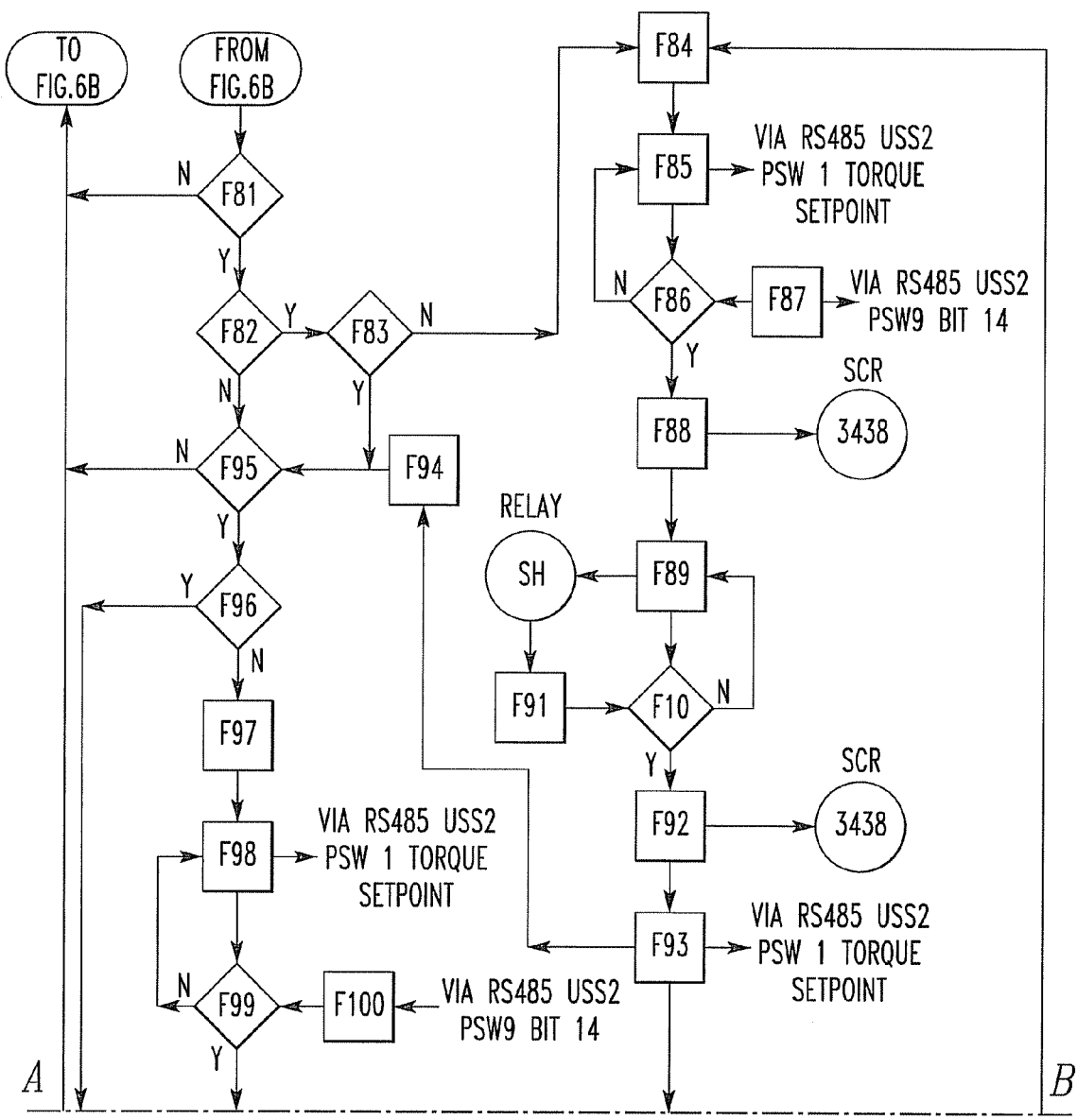
Figure 8B:
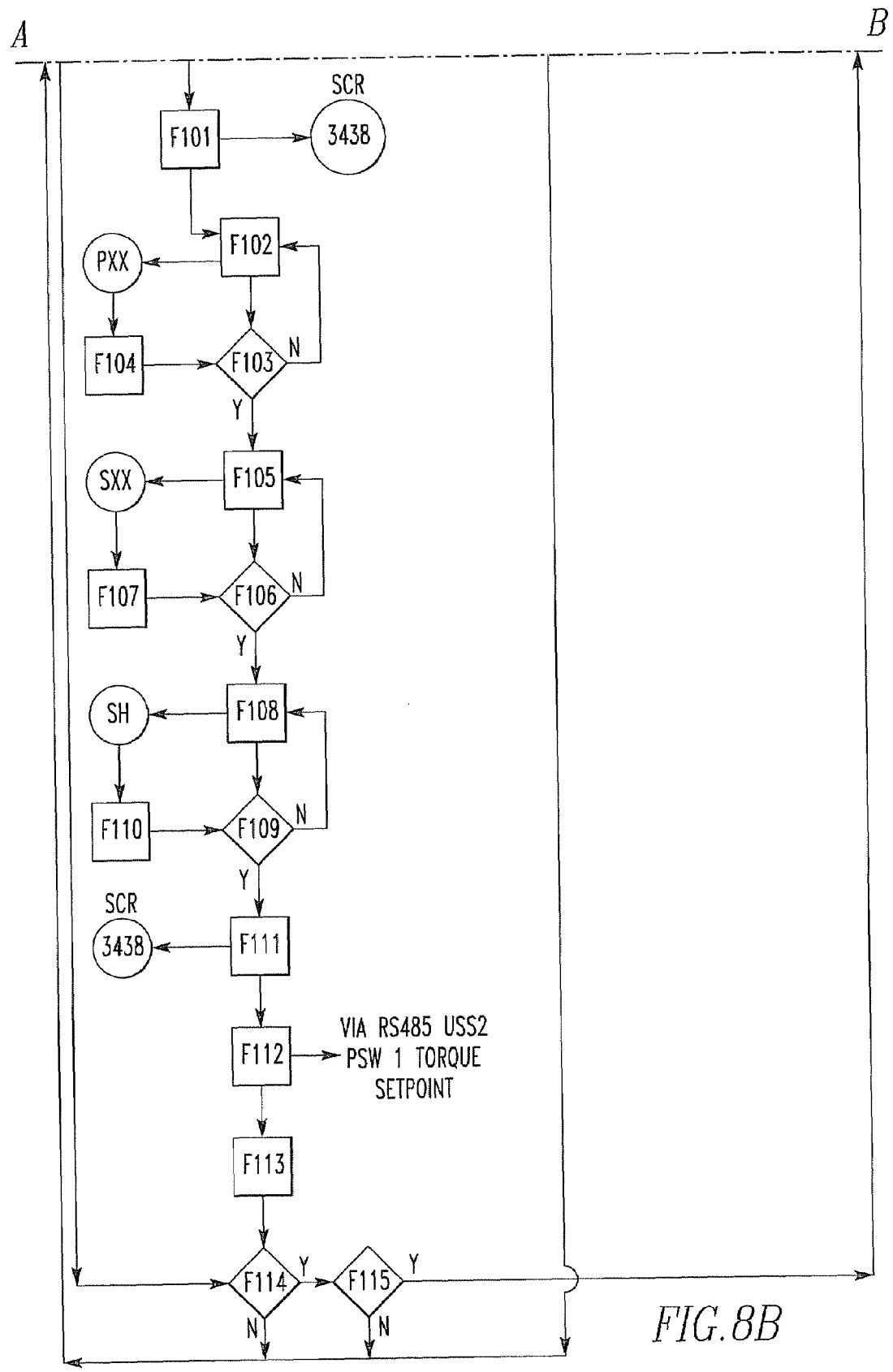

With specific reference to FIGS. 8A and 8B, if the locomotive's speed is a constant or increasing value, control is returned to the SCR Module (block F33) for transfer to either to SCR Module (block F116) or the Main Program (blocks A1 through H1). If the speed is decreasing as determined at block F81, the speed is checked to see if it is at a second shunting point at block F82. If the speed is at the second shunting point, control passes to the Dump Shunt Module (block F84) if the DS2 flag has not been set as determined by block F84. The DS2 flag is set when the second transition point is entered for the first time.

The Dump Shunt Module (block F84) dumps the shunt to keep the traction motor current at its optimum value. The torque reference is set to zero at block F85 and the control loops until the armature current is zero as determined by blocks F86 and F87. When the armature current is zero, the drive enable signal is removed from the drive at block F88, and the control power removed from the shunt contactor, thereby removing the shunt from the circuit (see block F89). Auxiliary contacts inform the SCR drive of the power conversion module 7 when the shunt has been removed (see block F91). If the shunt contactor cannot be confirmed open at block F90, the command to open the shunt contactor command is repeated. When the confirmation that the shunt contactor is open has been received, the drive enable signal to the SCR drive is asserted at block F92 and the torque command adjusted to provide a "bumpless" transfer at block F93. Control then returns to the SCR module where the DS2 flag is set at block F94.

Thereafter, the speed of the locomotive is checked to see if it is at the transition point at block F95. If not at a transition point, control will be returned to the SCR module (block F33) for transfer to either the SCR module (block F116) or the Main Program (blocks A1 through H1). If the speed of the locomotive is less than or equal to the transition speed, the PSM flag is checked at block F96. If the PSM flag is not set, control transfers to the Parallel to Series Module at block F97. If the PSM flag is set, control bypasses the Parallel to Series Module and goes to the shunting point 1 check at block F14.

The Parallel to Series Module (block F97) switches the traction motor circuits to series at the appropriate time. First, the Parallel to Series Module commands the torque signal to the SCR drives to be zero at block F98. The armature current is monitored at block F99 until the armature current reaches zero as provided by block F100. When the armature current is zero, the drive enable signal will be removed from the drive at block F110. Next, the PX are de-energized at block F102. Confirmation that the PX are de-energized is provided by monitoring the auxiliary contacts before the SXX are closed at block F103 and F104. Control loops continuously until the SXX are closed at blocks F105 and F106. After the SXX are confirmed closed at block F107, the shunt contactor is picked up at block F108. Control loops continuously until the shunt contactor is closed (see block F109). After the shunt contactor has been confirmed closed at block F110, the drive enable signal is reasserted at block F111 and the torque command is adjusted for a "bumpless" transfer at block 112. Control returns to the SCR module where the SPM flag is cleared and the PSM flag is set at block F113.

If the locomotive's speed is not at the shunting point, the Parallel to Series Module (block F97) is bypassed. If the speed is at the shunting point as determined at block F114, the status of the DS1 flag is checked at block F115. The DS1 flag is set when the first transition point is entered for the first time. If the DS1 flag is clear, control passes to the Dump Shunt Module (block F84) discussed hereinabove. If the DS1 flag is set, control will be returned to the SCR Module (block F33) for transfer to either SCR2 Module (block F116) or the Main Program (blocks A1 through H1).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A power generation and distribution system for providing power to at least one motor configured to drive a wheel of a vehicle, the system comprising:
    at least one power module comprising at least one generator configured to generate alternating current having a frequency and voltage;
    a single, common alternating current bus in electrical communication with the at least one power module through a contactor and configured to receive the alternating current therefrom;
    at least one power conversion module in electrical communication with the common alternating current bus and configured to convert the alternating current to a specified direct current for delivery to the at least one motor; and
    a controller configured to communicate with and operatively control at least one of the following: at least one component of the at least one power module; at least one component of the common alternating current bus; at least one component of the at least one power conversion module, or any combination thereof,
    wherein the controller is in communication with the at least one power module and configured to control at least one component of the at least one power module to generate alternating current having at least one of a specified frequency and a specified voltage.

2. The system of claim 1, further comprising an auxiliary module in electrical communication with the common alternating current bus and configured to deliver electrical power to at least one auxiliary unit associated with the vehicle.

3. The system of claim 2, wherein the auxiliary unit is at least one of the following: a lighting unit, a heating unit, an air conditioning unit, a ventilation unit, a drive unit, a radiator, a battery, a blower unit, a compressor unit, a control unit, a vehicle subsystem, a vehicle component, or any combination thereof.

4. The system of claim 2, wherein the auxiliary module further comprises a transformer configured to transform the voltage of the current on the common alternating current bus to another specified voltage prior to delivery to the auxiliary unit.

5. The system of claim 1, wherein the at least one power module comprises at least one engine configured to drive the at least one generator, the speed of the at least one engine controlled through a governor in electrical communication with a generator control unit configured to receive speed feedback data from the at least one engine for use in controlling operation of the governor.

6. The system of claim 1, wherein the at least one power module comprises a voltage regulator in communication with the generator, the voltage of the current generated by the generator controlled through the voltage regulator in communication with a generator control unit configured to receive voltage feedback data from the generator for use in controlling operation of the voltage regulator.

7. The system of claim 1, further comprising a generator protection system configured to monitor and provide monitoring data representing at least one of the current, frequency, and voltage generated by the generator and delivered to the common alternating current bus.

8. The system of claim 7, wherein, based upon the monitoring data, the generator protection system is configured to control at least one component of the at least one power module.

9. The system of claim 1, further comprising a plurality of power modules in communication with the common alternating current bus through a respective contactor.

10. The system of claim 9, wherein each of the plurality of power modules comprises a respective generator control unit configured to:
    receive voltage feedback data from the at least one generator in the respective power module;
    receive speed feedback data from at least one engine configured to drive the at least one generator in the respective power module;
    control the voltage of the current generated by the generator through a voltage regulator in communication with the generator, the control based at least in part upon at least one of the following: the voltage feedback data; the voltage of the current on the common alternating current bus; a specified voltage; the voltage of the current generated by the generator in another power module; or any combination thereof; and
    control the speed of the at least one engine through a governor in communication with the at least one engine, the control based at least in part upon at least one of the following: the speed feedback data; the frequency of the current on the common alternating current bus; a specified speed; the speed of at least one engine in another power module; or any combination thereof.

11. The system of claim 1, wherein the at least one power conversion module is in the form of a silicon-controlled rectifier configured to convert the alternating current to a specified direct current for delivery to the at least one motor, the specified direct current adjustable and based at least partially upon the desired operating conditions of the at least one motor.

12. The system of claim 1, further comprising a plurality of power modules in communication with the common alternating current bus through a respective contactor, wherein the controller is configured to automatically control and share at least a portion of at least one of the power load and the voltage amongst at least two of the plurality of power modules.

13. The system of claim 1, wherein the at least one power module comprises at least one engine configured to drive the at least one generator, and wherein the controller comprises an engine control module configured to at least one of the following: monitor at least one parameter of the at least one engine; monitor at least one parameter of the at least one power module; determine the amount of power available to the vehicle; or any combination thereof.

14. The system of claim 1, wherein the controller comprises a system load module configured to at least one of the following: initiate at least one action of at least one component of the at least one power module; determine the usage time of at least one component of the at least one power module; determine the status of at least one component of the at least one power module; monitor at least one parameter of at least one component of the at least one power module; or any combination thereof.

15. The system of claim 1, wherein the controller comprises a protection control module configured to at least one of the following: monitor at least one parameter associated with a control device in communication with at least one component of the at least one power module; monitor at least one parameter of at least one component of the at least one power module; monitor at least one parameter of at least one component of the at least one power conversion module; initiate at least one action of at least one component of the at least one power module; or any combination thereof.

16. The system of claim 1, wherein the controller comprises a power conversion control module configured to at least one of the following: monitor at least one parameter of at least one component of the power conversion module; initiate at least one action of at least one component of the at least one power conversion module; or any combination thereof.

17. The system of claim 1, wherein the controller comprises at least one control module configured to at least one of the following: monitor at least one parameter of the vehicle; control at least one action of at least one component of the vehicle; or any combination thereof.

18. A power generation and distribution system for providing power to at least one motor configured to drive a wheel of a vehicle, the system comprising:
   a plurality of power modules, each comprising at least one generator configured to generate alternating current having a frequency and voltage a single, common alternating current bus in electrical communication with at least one of the plurality of power modules through at least one contactor and configured to receive the alternating current therefrom;
   at least one power conversion module in electrical communication with the plurality of power modules and configured to convert the alternating current to a specified direct current for delivery to the at least one motor; and
   a controller configured to communicate with and operatively control at least one component of each of the plurality of power modules, wherein the controller is further configured to automatically control and share at least a portion of at least one of the power load and the voltage amongst at least two of the plurality of power modules,
   wherein the controller is in communication with the plurality of power modules and configured to control at least one component of the plurality of power modules to generate alternating current having at least one of a specified frequency and a specified voltage.

* * * * *